Nov. 30, 1943.  W. KIERSTED, JR  2,335,422
FILTRATION
Filed April 25, 1942
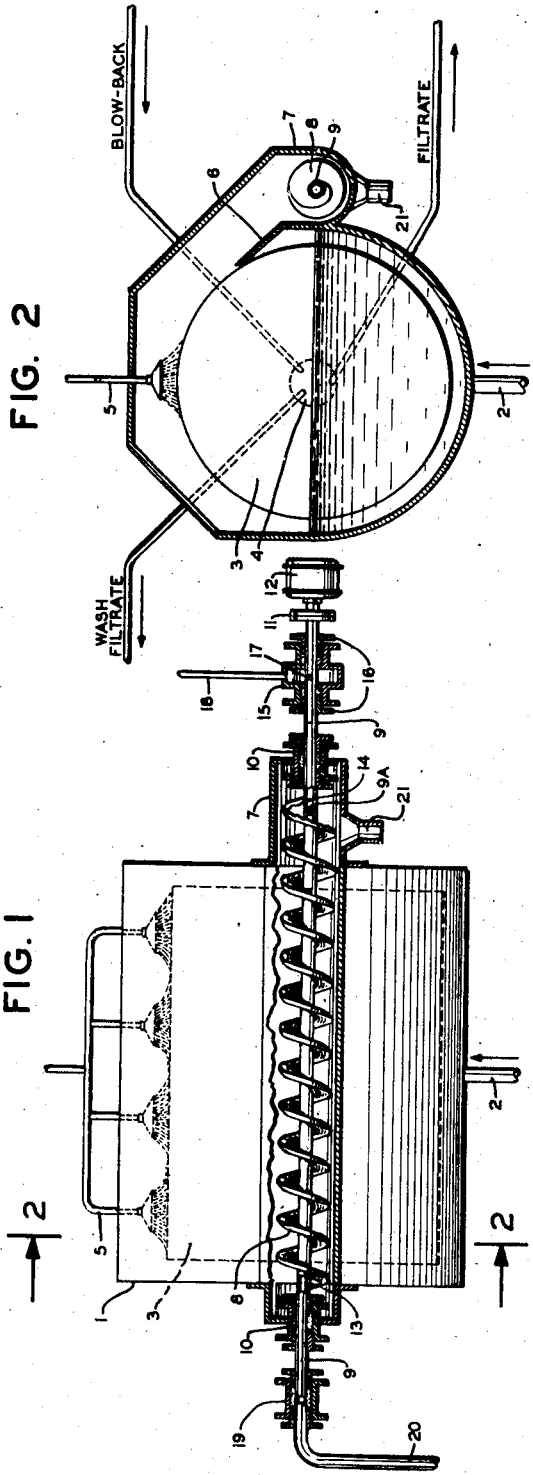
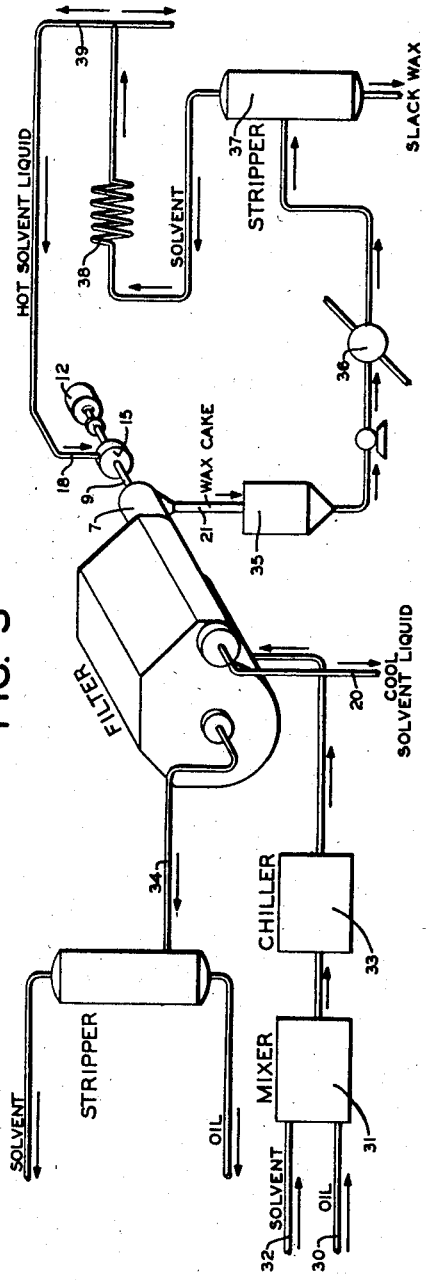
Inventor:
Wynkoop Kiersted, Jr.
Attorney:
R. J. Dearborn Patented Nov. 30, 1943

2,335,422

UNITED STATES PATENT OFFICE 2,335,422

FILTRATION

Wynkoop Kiersted, Jr., Scarsdale, N. Y., assignor to The Texas Company, New York, N. Y., a corporation of Delaware Application April 25, 1942, Serial No. 440,445

8 Claims. (Cl. 210—201)

This invention relates to a method of and apparatus for filtration, and particularly to filtration of solidified material from a mixture of liquid and solids.

The invention contemplates a continuous rotary type of filter with a scroll or screw conveyor discharge for the filter cake and having means for heating the conveyor element so as to facilitate continuous discharge of the separated solid material from the filter apparatus. The invention has particular application to the dewaxing of wax-bearing oil by a process involving filtration.

In dewaxing oil by filtration a wax-bearing oil is mixed with a dewaxing solvent and chilled to a temperature in the range of about 0° F. to minus 30° F., or even lower, in order to precipitate wax constitutents of the oil as solidified hydrocarbons. This chilled mixture is passed to a continuous rotary filter wherein the solidified wax is separated from the liquid hydrocarbons in the form of a filter cake, and the dewaxed oil is obtained as a filtrate.

The filter apparatus preferred for dewaxing usually comprises a totally-enclosed vacuum filter of the rotating drum type. The filter cake of wax is scraped or otherwise dislodged from the rotating filter surface and falls into a horizontal screw conveyor formed as an integral part of the filter bowl and shell. The conveyor thus removes the dislodged filter cake from the filter apparatus, discharging it into a suitable tank or receiver.

There is considerable tendency at times for the wax filter cake to clog up in the conveyor and thus interrupt the continuous operation of the filter.

The solid waxy material sticks or otherwise adheres to the surface of the screw or helical impelling member which usually consists of a shaft to which are attached a series of "flights." The adherence of solid material to the surfaces of the screw materially reduces its efficiency in forcing the solid material through the conveyor trough. During continued operation the quantity of waxy material adhering to the screw increases and in a short time there is a large mass of solid waxy material adhering to and rotating with the screw, instead of permitting the surface of the screw to slip or slide freely through the solid mass and thereby push the mass forward through the trough of the conveyor.

In dewaxing it is desirable to operate so that the filter cake is as free from solvent as possible as it leaves the filter surface and falls into the conveyor. However, the less solvent the cake contains the greater the tendency toward sticking in the conveyor. The present invention is of particular advantage in dewaxing so as to discharge a wax cake relatively low in solvent content.

Therefore, my invention involves maintaining a fluid film between the solid waxy mass and the surface of the screw to avoid the aforesaid sticking action and to permit the surface of the screw to slide freely through the solid mass. In this way the screw operates at full efficiency and can move the solid mass forward through the trough of the conveyor without substantial liquefaction of the wax.

It is desirable to avoid liquefying any substantial amount of the waxy mass while it remains in the conveyor since this would involve the liberation of some heat in the filter hood and this is highly undesirable because it results in objectionable warming of the atmosphere within the hood. Such warming has been found to interfere with the efficient operation of the filter in dewaxing lubricating oil stocks or in separating wax from wax-bearing mixtures.

In accordance with my invention the helical screw or scroll element of the filter discharge conveyor is designed to receive a limited amount of heat from a suitable source and transfer it to the waxy mass moving through the conveyor. In a preferred form of the invention a hollow screw or scroll is employed with means for passing a fluid heat carrying medium through the interior of the element. The heat carrying medium advantageously comprises warm solvent liquid stripped from the wax concentrate or from the dewaxed filtrate in a subsequent stage of the process.

In order to describe the invention more fully reference will now be made to the figures of the accompanying drawing.

In the drawing Figs. 1 and 2 represent semisectional and diagrammatic views of a continuous rotary drum type of filter such as is used in the dewaxing of mineral oil and which requires no detailed description.

As illustrated in Figs. 1 and 2, the filter comprises a shell 1, the lower portion of which forms a filter bowl into which the mixture to be filtered is introduced through a pipe 2.

A hollow drum 3 whose cylindrical surface forms the filtering surface is rotatably supported within the shell 1. The cylindrical filtering surface is divided into separate sections or segments, each communicating by means of conduits with a hollow shaft 4 which supports the drum 3. One end of the shaft 4 terminates in a conventional type of filter valve through which provision is made for withdrawing the filtrate and wash filtrate, and also for introducing blow-back gas for dislodging the filter cake from the filter surface.

Sprays 5 communicating with a source of wash solvent are provided in the upper portion of the filter shell for introducing a spray wash for washing the filter cake in situ and prior to dislodgment from the filter surface.

The washed filter cake is scraped from the filter surface by a suitable scraper 6 and drops into a conveyor trough or conduit 7. The conduit 7 extends horizontally along the side of the filter shell.

Within the conduit 7 is a hollow scroll 8 supported on a shaft 9.

The shaft 9 is rotatably supported in stuffing boxes 10 provided in each end of the conduit 7. One end of the shaft 9 is coupled by means of a coupling 11 to a motor 12 and by which means the scroll is subjected to rotation within the conduit 7.

The shaft 9 is hollow and ports 13 and 14 provide communication between the interior of the shaft 9 and the interior of the ends respectively of the hollow spiral 8. A restrictive orifice 9a is placed within the interior of the shaft 9 so as to cause flow of heat carrier fluid through the hollow spirals as well as through the hollow shaft.

A stationary box 15 surrounds shaft 9 at one end, suitable stuffing boxes 16 being provided to prevent escape of fluid between the surface of the rotating shaft and the adjacent bearing surface of the box 15. A port 17 provides fluid access to the interior of the hollow shaft 9 within the box 15.

The box 15 is provided with a pipe connection 18 through which fluid may be withdrawn from or introduced to the interior of the box.

The opposite end of the shaft 9 terminates in a stuffing box 19 and through which means it communicates with the open end of a corresponding stationary pipe 20. The pipe 20 provides means for introducing fluid to or withdrawing it from the hollow end of the shaft 9.

Thus, in actual operation a heat carrier fluid, either liquid or gaseous, is caused to flow through the interior of the scroll 8 continuously during its rotation. The filter cake material still in substantially solid form is discharged from the conduit 7 through a chute 21.

The heat carrier fluid may flow through the hollow scroll in either direction, as desired.

Fig. 3 illustrates an adaptation of the above described filter apparatus to the dewaxing of wax-bearing mineral lubricating oil.

The wax-bearing oil, from a source not shown, is conducted through a pipe 30 to a mixer 31 wherein it is mixed with dewaxing solvent liquid introduced through a pipe 32, also from a source not shown.

The solvent, for example, may consist of a mixture of about 40% methylethyl ketone and 60% commercial benzol. The solvent mixture is mixed with the wax-bearing oil in the proportion of about three or four parts of solvent mixture to one part of wax-bearing oil by volume.

The resulting mixture is passed through a chiller 33, wherein it is chilled to a temperature of about minus 10 or minus 15° F. in order to precipitate the wax constituents as solid hydrocarbons. The chilled mixture is then introduced to the filter bowl of a rotary filter, such as illustrated in Figs. 1 and 2.

The resulting filtrate, comprising solvent liquid mixed with dewaxed oil, having a pour test of about 0 to minus 10° F. is withdrawn through a pipe 34, through which it is conducted either to a receiver or to a stripper, for recovering the solvent.

The wax cake formed in the filter is discharged into the conduit 7 containing the hollow heated scroll 8. From the conveyor the wax cake is discharged through the chute 21 into a receiver 35. The wax cake is subjected to further heating in a heat exchanger 36 and from there passed to a stripper 37 for recovery of the solvent.

The solvent vapors are passed through a condenser 38 and a suitable portion of distillate at a temperature of about 110° F. is conducted through a pipe 39 communicating with the pipe 18 and through which it is introduced to the box 15.

The temperature and amount of warm solvent conducted through the interior of the hollow screw is controlled so as to maintain the skin temperature of the "flights" of the screw just high enough to prevent sticking of the solid waxy material to the metal. For example, this skin temperature may range from about 60 to 90° F. It is contemplated that the skin temperature is merely sufficient to form a relatively thin film of liquid, such liquid consisting largely of solvent present in the solid waxy mass passing through the conveyor. This film of liquid keeps the metal surface wet, thereby facilitating its movement through the waxy mass.

From the box 15 the solvent distillate flows into the interior of the hollow shaft 9 and passes along through the hollow scroll, escaping at the opposite end through pipe 20. The solvent liquid passes from the pipe 20 in a partially cooled condition to a direct expansion ammonia chiller for final chilling after which it may be either introduced through spray conduits 5 to wash the wax cake or added as additional diluent to the wax-bearing charge and solvent mixture at the outlet of chiller 33.

Thus, the wax cake is received in the receiver 35 at substantially the same temperature as that at which it leaves the filter surface or at a temperature which is usually not more than about 2 or 3 degrees higher than the temperature at which it leaves the filter surface and enters the trough of the conveyor.

While the filter apparatus has been described as particularly applicable to the dewaxing of wax-bearing lubricating oil, it is contemplated that it is applicable to other industrial uses involving the filtration of liquefiable solid materials from mixtures of such solids with liquids.

The specific means described above for supplying heat to the rotating scroll may vary from that described. Also the screw may be in the form of a hollow shaft with solid fins or flights.

The present application is a continuation-in-part of my pending application, Serial No. 317,835, filed February 8, 1940, for Filtration.

Obviously many modifications and variations of the invention as hereinbefore set forth may be made without departing from the spirit and scope thereof and, therefore, only such limitations should be imposed as are indicated in the appended claims.

I claim:
1. The method of separating wax from a mix- ture of oil and wax which comprises chilling the mixture to a temperature sufficiently low to solidify wax, filtering the chilled mixture in a filter provided with a filter cake discharge conveyor having a hollow impelling screw, said conveyor being arranged to conduct filter cake, dislodged from the filter surface, from the interior to the exterior of the filter housing, passing warm fluid through the hollow screw in an amount and at a temperature sufficient to maintain substantially all of the surface of the screw which is in contact with wax sufficiently warm to prevent substantial sticking of solid wax to said surface but insufficient to cause substantial liquefaction of said wax during passage through the conveyor, discharging the solidified wax from said conveyor at a temperature not substantially above the temperature at which the filter cake enters the conveyor, and separately discharging filtrate from the filter.

2. The method of separating wax from a mixture of oil and wax which comprises chilling the mixture to a temperature sufficiently low to solidify wax, filtering the chilled mixture in a filter provided with a filter cake discharge conveyor having a hollow impelling screw, said conveyor being arranged to conduct filter cake, dislodged from the filter surface, from the interior to the exterior of the filter housing, passing through the hollow screw a stream of fluid in an amount and at a temperature sufficient to maintain substantially all of the surface of the screw which is in contact with wax at a temperature of about 60 to 90° F. and such that sticking of solid wax to said surface is substantially avoided, discharging solidified wax from said conveyor at a temperature not substantially above that at which it enters the conveyor, and separately discharging filtrate from the filter.

3. The method of separating wax from a mixture of oil and wax which comprises chilling the mixture to a temperature sufficiently low to solidify wax, filtering the chilled mixture in a filter provided with a filter cake discharge conveyor having a hollow impelling screw, said conveyor being arranged to conduct filter cake, dislodged from the filter surface, from the interior to the exterior of the filter housing, passing through the hollow screw a stream of fluid in an amount and at a temperature sufficient to maintain substantially all of the surface of the screw which is in contact with wax at a temperature not in excess of about 90° F., maintaining said surface wet with a relatively thin film of liquefied filter cake sufficient to prevent substantial sticking of the solid cake to the surface, discharging the cake in solid form from the conveyor at a temperature not substantially above the temperature at which it enters the conveyor, and separately discharging filtrate from the filter.

4. The method of dewaxing wax-bearing lubricating oil which comprises mixing the wax-bearing oil with a normally liquid solvent chilling the mixture to a temperature sufficiently low to solidify wax, filtering the chilled mixture in a filter provided with a conveyor having a hollow screw, said conveyor being adjacent the filter element within the filter bowl for receiving the wax cake removed from the filter element and for discharging the received wax from the filter, continuously passing through the hollow screw a stream of fluid at a temperature not in excess of about 110° F., so as to prevent adherence of solid wax to the screw, discharging the cake in solid form from the conveyor at a temperature not substantially above the temperature at which it enters the conveyor, and separately discharging the filtrate from the filter.

5. The method of dewaxing wax-bearing lubricating oil which comprises mixing the wax-bearing oil with a normally liquid solvent chilling the mixture to a temperature sufficiently low to solidify wax, filtering the chilled mixture in a filter provided with a conveyor having a hollow screw, said conveyor being adjacent the filter element within the filter bowl for receiving the wax cake still retaining some liquid and for discharging the received wax from the filter, distilling retained liquid from the discharged wax cake, continuously passing through said hollow screw a stream of said distilled liquid at a temperature not in excess of about 110° F., so as to prevent adherence of solid wax to the screw, discharging the cake in solid form from the conveyor at a temperature not substantially above the temperature at which it enters the conveyor and separately discharging the filtrate from the filter.

6. The method of separating constituents which can be solidified from a liquid mixture containing such constituents which comprises chilling the mixture to a temperature sufficiently low to effect solidification of said constituents in at least substantial amount, filtering the chilled mixture of liquid and solids in a filter provided with a screw conveyor discharge, said conveyor being arranged to conduct filter cake, dislodged from the filter surface, from the interior to the exterior of the filter housing, adding heat from an extraneous source to the screw within the conveyor, controlling the amount of heat added so as to maintain substantially all of the surface of the screw which is in contact with the cake sufficiently warm to prevent substantial sticking of cake to said surface but insufficient to cause substantial liquefaction of the cake during passage through the conveyor, discharging the filter cake solids from the conveyor without substantial liquefaction and separately discharging liquid from the filter as filtrate.

7. The method of separating constituents which can be solidified from a liquid mixture containing such constituents which comprises chilling the mixture to a temperature sufficiently low to effect solidification of said constituents in at least substantial amount, filtering the chilled mixture of liquid and solids in a filter provided with a screw conveyor discharge, said conveyor being arranged to conduct filter cake, dislodged from the filter surface, from the interior to the exterior of the filter housing, maintaining substantially all of the surface of said screw which is in contact with the cake wet with a film of liquid sufficient to prevent sticking of cake to said surface but insufficient to cause substantial liquefaction of said cake during passage through the conveyor, discharging the filter cake solids from the conveyor without substantial liquefaction and separately discharging liquid from the filter as filtrate.

8. The method of separating constituents which can be solidified from a liquid mixture containing such constituents, which comprises chilling the mixture to a temperature sufficiently low to effect solidification of said constituents in at least substantial amount, filtering the chilled mixture of liquid and solids in a filter provided with a screw conveyor discharge, said conveyor being arranged to conduct dislodged filter cake from the interior to the exterior of the filter housing, adding heat from an extraneous source to the screw within the conveyor in an amount sufficient to maintain substantially all of the surface of the screw which is in contact with the cake at a temperature higher than the temperature at which the cake enters the conveyor but insufficiently high to cause substantial liquefaction of the cake, maintaining said screw surface wet with a film of liquid formed from the cake such that sticking of cake to the screw surface is substantially avoided, discharging the filter cake solids from the conveyor without substantial liquefaction and separately discharging liquid from the filter as filtrate.

WYNKOOP KIERSTED, Jr.